3,462,415
PROCESS FOR PURIFYING FLAVINE ADENINE DINUCLEOTIDE

Masao Tanaka, Nobuo Nakamura, and Seigo Takasawa, Tokyo, Japan, assignors to Kyowa Hakko Kogyo Kabushiki Kaisha, Chiyoda-ku, Tokyo-to, Japan, a body corporate of Japan
No Drawing. Filed May 2, 1967, Ser. No. 635,404
Claims priority, application Japan, May 2, 1966, 41/27,542
Int. Cl. C07d 57/32, 51/50
U.S. Cl. 260—211.5            9 Claims

ABSTRACT OF THE DISCLOSURE

Separation of flavine adenine dinucleotide from impurities in a crude product containing it is effected by adsorbing the FAD together with the impurities onto a strongly basic anion exchange resin bed by contacting the resin with an aqueous solution of the crude product, and then passing through the resin bed an eluant comprising an aqueous hydrochloric acid solution containing an amount of calcium chloride sufficient to elute the impurities but insufficient to effect any substantial elution of the FAD.

BACKGROUND OF THE INVENTION

The present invention relates to a process for purifying flavine adenine dinucleotide (hereinafter designated as FAD). More particularly, the present invention relates to a process of purifying FAD, which is contaminated mainly with flavines, especially flavine mononucleotide (hereinafter designated as FMN) and/or cyclic flavine mononucleotide (hereinafter designated as FMNX), thereby to obtain highly purified FAD in a manner applicable to industrial production with lower costs.

FAD is present in many substances which are important in various enzymatic reactions in living bodies, and represents one of the biologically active forms of vitamin B2 (riboflavin). FAD has thus been used as a substitute for riboflavin both as a medicament and as an additive to food and feed-stuffs because of its strong activity and high solubility in water. Therefore, it has been desired for years to establish an economical and industrial process for the production of FAD.

It is known that FAD can be purified, for example, by chromatographic adsorption methods using anion exchange resins, cation exchange resins, active carbon, terra alba, Florisil [trade name of the synthetic analytical adsorbent available from Floridin Co., Inc., Tallahassee, Fla., U.S.A.] or by precipitation methods involving either the addition of metallic salts or the formation of reduced FAD. Conventionally, anion exchange resins have been found to be more suitable for application to the industrial purification of FAD than other materials, and those including strongly basic anion exchange resins have been used for the purification of relatively large amounts of FAD.

In the case of the purification of FAD by using strongly basic anion exchange resins, the mother liquor is adsorbed onto a Cl-form resin bed, which is eluted with hydrochloric acid and a buffer solution containing sodium chloride and lithium chloride to separate the desired FAD and impurities by changing the concentration of the salt and/or acidity of the solution. This process has been found to be suitable from the standpoint of ease of practical operation and availability of cheap eluant. However, it may not always effect a sufficient separation of FAD from impurities, such as e.g., FMN, when applied industrially. This is true since in cases in which larger amounts of the crude solution are treated with a certain volume of the resin, there may be introduced various problems, such as e.g. separation difficulties and requirements for control of hazards. In addition, various flavinic impurities other than FMN, such as e.g. FMNX, may be eluted in the FAD-containing fractions under normal conditions using any of the conventional eluting solutions, whereby it is difficult to obtain highly purified FAD. These disadvantages thus inhibit the successful application of this process to practice.

DESCRIPTION OF THE PREFERRED EMBODIMENTS

We have studied the anion exchange chromatography of various flavinic compounds, including FAD and FMN, and have now made the discovery that FAD can with advantage be separated fractionally from various impurities, which include not only FMN but also nucleotides, by the use of an aqueous solution of hydrochloric acid containing calcium chloride to replace conventional eluants. The present invention is based on this discovery that calcium chloride can be used as advantageous eluant for the ion exchange chromatography of flavinic compounds, wherein anion exchange resins are used, and offers an excellent process which is applicable to commercial purification of FAD.

According to the present invention, we provide a process for the purification of FAD by means of ion exchange chromatography using strongly basic anion exchange resins, characterized by adjusting, if necessary, an aqueous solution of crude FAD, which contains impurities such as FMN, to a slightly acidic or higher pH, contacting the resulting solution with a strongly basic anion exchange resin bed to adsorb flavinic compounds thereon, and washing with a slightly acidic aqueous solution of hydrochloric acid, which contains relatively low concentration of calcium chloride, thereby eluting impurities including FMN and FMNX as well as nucleotides.

Under these conditions, it has been found that FAD, when adsorbed onto the resin bed, is not substantially eluted and thus, after thorough washing with the said eluant, only FAD can be eluted by a subsequent elution with an aqueous hydrochloric acid solution containing a sufficiently high concentration of sodium chloride, calcium chloride, etc., thus yielding a highly pure aqueous solution of FAD.

With regard to the ion exchange resins useful for the process of the present invention, any of the various strongly basic anion exchange resins of the conventional types may be used, irrespective of whether they are of types I or II. Preferred exchange resins include, for example, such commercial products as Dowex 1X2 (Dow Chemical Co., U.S.A.), Amberlite IRA-411 (Rohm & Haas Co., U.S.A.), Diaion SA 21A (Mitsubishi Kasei Kogyo K.K., Tokyo, Japan), and Duolite A-40 (Diamond Alkali Co., U.S.A.). Before the application of the crude FAD solution the resin is preferably washed with a suitable acid or alkali and is then converted to the Cl-form with hydrochloric acid or a suitable chloride. Although resins treated with various other anions may be used as the salt form of the resin, better results can be achieved by the use of the Cl-form resin from the standpoints of easier operation and production of better yields.

The crude aqueous FAD solution is preferably contacted with the resin by the use of a suitable packed resin column through which the solution is passed in view of the carrying out of the subsequent chromatography.

The FAD solution to be passed through the resin bed, is preferably adjusted to a pH of about 4.0. The adsorption efficiency can be improved at a higher pH, but a higher pH is liable to contribute to the instability of the FAD. It is therefore necessary to keep the FAD at a pH of about 4.0–8.0.

When the solution to be passed through the resin column contains large amounts of salts, the adsorption of FAD can be deleteriously affected and various problems in connection with the subsequent ion exchange chromatographic treatment are introduced. In order to obtain better results under such conditions, it is desirable to dilute the salt concentration by increasing the volume of the solution in such a manner that no more than about 5–10 grams of FAD would be adsorbed onto one equivalent of the resin.

According to the present invention, it is possible to use an aqueous solution of hydrochloric acid containing calcium chloride for washing out various flavinic impurities other than FAD, and desirably various nucleotidic impurities. Although varying ratios with respect to the concentrations of calcium chloride and hydrochloric acid may be used for this purpose, good results can be achieved, for example, by the use of an aqeuous 0.01 N hydrochloric acid solution containing 0.02–0.04 molar of calcium chloride.

It has been found that flavinic and nucleotidic compounds, such as, e.g., FMN, FMNX, adenosine monophosphate, adenosine diphosphate and inosine monophosphate can be almost completely eluted, while no or little FAD transfers from the upper layer of the resin bed into the fractions containing impurities, thereby achieving a complete separation.

It is possible to use any of the conventional eluants in order to elute FAD from the ion exchange resin bed, from which various impurities have been completely removed, and good results can also be obtained by the use of an aqueous hydrochloric acid solution, which contains a higher concentration of calcium chloride than that of the washing solution. Preferred eluants of this type include for example an aqueous solution of hydrochloric acid, e.g. 0.1 N HCl, that containing sodium chloride (e.g. 1 molar NaCl-0.005 N HCl) or that containing calcium chloride (e.g. 0.1 molar $CaCl_2$-0.01 N HCl) etc. Among the various eluants which may be used for this step, better results can be achieved by using a dilute aqueous solution of hydrochloric acid containing a suitable salt due to the fact that its pH is not too low, that there is no danger of the decomposition of FAD, that the volume of the FAD-containing fraction is not large, and that, furthermore, a better recovery can be achieved.

The FAD solution thus obtained, which contains almost no impurities such as FMN, FMNX, etc., is adjusted to a suitable pH and is concentrated. It is possible to obtain FAD having a high purity by the precipitation. However, in order to prevent possible contamination by the salts contained in the eluate, it is desirable to remove the salts from the eluate by a suitable conventional method, and after the adjustment of the pH, the eluate is concentrated to precipitate purified FAD.

When the elution is carried out by the use of the eluant containing calcium chloride, the eluate is neutralized, e.g. with calcium carbonate, and the calcium salt of FAD can easily be crystallized by the concentration of the filtrate. The FAD obtained has a very high purity and contains substantially no impurities, such as e.g. FMN, FMNX and riboflavine. According to the process of the present invention, FAD having a high purity can be obtained easily with a good yield.

The following examples illustrate the invention, but are not intended to limit its scope. It is to be noted that the various combinations of calcium chloride and HCl exemplified in the following examples do not limit the scope of the present invention.

Example 1

A crude FAD powder (weight—6 grams) having a purity of 82.1% and containing FMN, FMNX, coloring matters, etc. is dissolved in 2 liters of water and is passed downwards through a resin column packed with Dowex 1X2 (the trade name of a strongly basic anion exchange resin available from Dow Chemical Co., U.S.A.), which has been regenerated to its Cl-form. Both FAD and impurities are adsorbed on the upper area of the resin. The resin bed is washed with water to force out unadsorbable impurities such as riboflavine. Then, 50 liters of an aqueous 0.02 molar $CaCl_2$-0.001 N HCl solution are passed through the column at a flow rate of 10 liters per hour. Small amounts of contaminants such as adenylic acid, guanylic acid, inosinic acid, etc. are first eluted and then FMN and further impurities such as FMNX, are eluted. On the other hand, FAD shows almost no transfer from the upper part of the resin bed during the eluting step and is absolutely not eluted into the eluate. When the UV-absorption of the eluate has almost disappeared, FAD is eluted with 0.5 molar $CaCl_2$-0.001 N HCl. One liter of an eluate containing highly pure FAD and having a pH of 3.2 is obtained. The pH of this eluate is adjusted to 5.4 by adding calcium carbonate. After filtering the precipitate which forms, the filtrate is concentrated under reduced pressure at 40° C. to 100 ml., is cooled and then allowed to stand to crystallize the calcium salt of FAD.

The crystals are filtered and dried to give 4.3 g. of the calcium salt of FAD having a purity of 98.2%. This FAD contains absolutely no impurities of flavines, such as FMN.

Example 2

8 g. of crude FAD having a purity of 72.6% are dissolved in 2 liters of water and passed through a resin column packed with 1 liter of the strongly basic anion exchange resin, Diaion SA 21A (a product of Mitsubishi Kasei Kogyo K.K., Tokyo, Japan), which has been regenerated to its Cl-form similarly to that described in Example 1. After water-washing, the resin bed is washed and eluted with 30 liters of 0.03 molar $CaCl_2$-0.01 N HCl to remove impurities, such as FMN. The resin bed on which only FAD remains, is washed with about 2 liters of water to remove calcium ions, and FAD is eluted by 1 molar NaCl-0.05 N HCl. The eluate thus obtained is passed through 1 liter of resin bed of a phenolic cation exchange resin, Duolite C–10, which has been regenerated to its Na-form. Only FAD is adsorbed on the resin. The resin bed is eluted with pure water and the eluate is concentrated under reduced pressure at a temperature below 40° C. to 50 mg./ml. of FAD. Two times its volume of acetone is added to the concentrate to crystallize the sodium salt of FAD. The thus obtained sodium salt of FAD (4.0 grams) has a purity of 97.3% and contains absolutely no FMN, etc.

Example 3

5 g. of the same preparation used in Example 2 are dissolved in 1 liter of water and adsorbed on 1 liter of the strongly basic anion exchange resin, Amberlite IRA–411 (product of Rhom & Haas Co., U.S.A.) which has been regenerated to its Cl-form, similarly to that described in Examples 1 and 2. After washing with water, impurities are eluted with 10 liters of an aqueous 0.02 molar $CaCl_2$-0.001 N HCl solution and then with 5 liters of 0.04 molar $CaCl_2$-0.001 N HCl aqueous solution. The FAD which remains adsorbed on the resin is eluted, desalted, concentrated and crystallized to yield 2.9 g. of the sodium salt of FAD having a purity of 98.6%.

We claim:

1. A process for purifying crude flavine adenine dinucleotide contaminated with other flavinic impurities, comprising contacting a strongly basic anion exchange resin with an aqueous solution of the crude product at a slightly acidic or higher pH to adsorb said dinucletotide and said impurities onto said resin and eluting said impurities from said resin with a slightly acidic aqueous solution of hydrochloric acid containing calcium chloride in an amount sufficient to elute said impurities but insufficient to elute any substantial quantity of said dinucleotide.

2. A process as defined in claim 1 in which said dinucleotide adsorbed onto the resin is subsequently separated from the resin.

3. A process as defined in claim 1 in which said aqeuous solution of said crude product is passed through a column of the strongly basic anion exchange resin to effect the adsorption.

4. A process as defined in claim 1 in which the adsorption is effected at a pH of about 4.0–8.0.

5. A process as defined in claim 4 in which said strongly basic anion exchange resin in a salt form is contacted with said aqueous solution of said crude product.

6. A process as defined in claim 5 in which said strongly basic anion exchange resin is in its Cl form.

7. A process as defined in claim 2 in which said dinucleotide is subsequently separated by elution with an aqueous solution of hydrochloric acid.

8. A process as defined in claim 7 in which the said aqueous solution of hydrochloric acid contains at least one salt selected from the group consisting of sodium chloride and calcium chloride.

9. A process as defined in claim 8 in which said elution is continued until the washings are substantially colorless and show no significant U.V. absorption.

References Cited
UNITED STATES PATENTS

| | | | |
|---|---|---|---|
| 3,157,635 | 11/1964 | Tanaka et al. | 260—211.5 |
| 3,278,517 | 10/1966 | Marumo et al. | 260—211.5 |

LEWIS GOTTS, Primary Examiner

JOHNNIE R. BROWN, Assistant Examiner